(12) United States Patent
Kothe et al.

(10) Patent No.: US 7,803,853 B2
(45) Date of Patent: Sep. 28, 2010

(54) SETTABLE MIXTURE CONTAINING LIME, A CEMENTITIOUS COMPOSITION AND A POLYMER

(75) Inventors: Thomas Kothe, Gebenstorf (CH); Max Oppliger, Allschwil (CH)

(73) Assignee: Construction Research & Technology GmbH, Trostberg (DE)

(*) Notice: Subject to any disclaimer, the term of this patent is extended or adjusted under 35 U.S.C. 154(b) by 0 days.

(21) Appl. No.: 10/584,869

(22) PCT Filed: Dec. 3, 2004

(86) PCT No.: PCT/EP2004/013737

§ 371 (c)(1), (2), (4) Date: Apr. 20, 2007

(87) PCT Pub. No.: WO2005/070849

PCT Pub. Date: Aug. 4, 2005

(65) Prior Publication Data

US 2007/0298249 A1 Dec. 27, 2007

(30) Foreign Application Priority Data

Jan. 26, 2004 (GB) .................................. 0401603.6

(51) Int. Cl.
- C04B 24/26 (2006.01)
- C04B 7/32 (2006.01)
- C04B 7/36 (2006.01)
- C04B 9/11 (2006.01)
- C04B 11/28 (2006.01)
- C04B 28/06 (2006.01)
- C04B 2/00 (2006.01)
- C08K 3/00 (2006.01)

(52) U.S. Cl. ........................ 524/2; 106/695; 106/792

(58) Field of Classification Search .................... 524/2; 106/695, 792; 428/335

See application file for complete search history.

(56) References Cited

U.S. PATENT DOCUMENTS

| 4,350,533 | A | 9/1982 | Galer et al. |
| 6,514,334 | B1* | 2/2003 | Perry et al. ............. 106/713 |
| 2002/0009622 | A1* | 1/2002 | Goodson ............. 428/703 |
| 2002/0157576 | A1* | 10/2002 | Mills et al. ............. 106/724 |
| 2002/0161071 | A1* | 10/2002 | Mills et al. ............. 524/2 |
| 2004/0068042 | A1 | 4/2004 | Bachon et al. |
| 2005/0000391 | A1* | 1/2005 | Rydgren et al. ............. 106/656 |

FOREIGN PATENT DOCUMENTS

| DE | 101 29 151 A1 | 2/2002 |
| JP | 2001163650 A * | 6/2001 |
| WO | WO 98/58886 A | 12/1998 |
| WO | WO 01/28955 A | 4/2001 |

OTHER PUBLICATIONS

Patent Abstracts of Japan, vol. 1999, No. 09; Jul. 30, 1999 & JP 11 100251 A (Oozeka, Kaguka Hogyo KK), Apr. 13, 1999.

* cited by examiner

*Primary Examiner*—Mark Eashoo
*Assistant Examiner*—Angela C Scott
(74) *Attorney, Agent, or Firm*—Curatolo Sidoti Co. LPA; Joseph G. Curatolo; Salvatore A. Sidoti

(57) ABSTRACT

The present invention refers to a settable mixture comprising (i) a water absorbing composition and (ii) an aqueous emulsion of organic polymer or (iii) dispersible organic polymer, wherein the water absorbing composition (i) contains inorganic ingredients which are capable to react with water and the water absorbing composition (i) contains at least 13 weight % lime and at least 5 weight % of a cementitious composition of which components form ettringite during the absorption of water and wherein the amount of the aqueous emulsion of organic polymer (ii) in relation to (i) is such as to provide a ratio of combined weight of polymer solids to combined weight of ingredients which are capable to react with water of from 0.5:1 to 10:1, preferably 1:1 to 4:1 and wherein the amount of dispersible organic polymer (iii) in relation to (i) is such as to give a ratio of combined weight of polymers to combined weight of ingredients which are capable to react with water of from 0.5:1 to 10:1, preferably 1:1 to 4:1.

20 Claims, 3 Drawing Sheets

SETTABLE MIXTURE CONTAINING LIME, A CEMENTITIOUS COMPOSITION AND A POLYMER

CROSS REFERENCE TO RELATED APPLICATIONS

Figure 1:
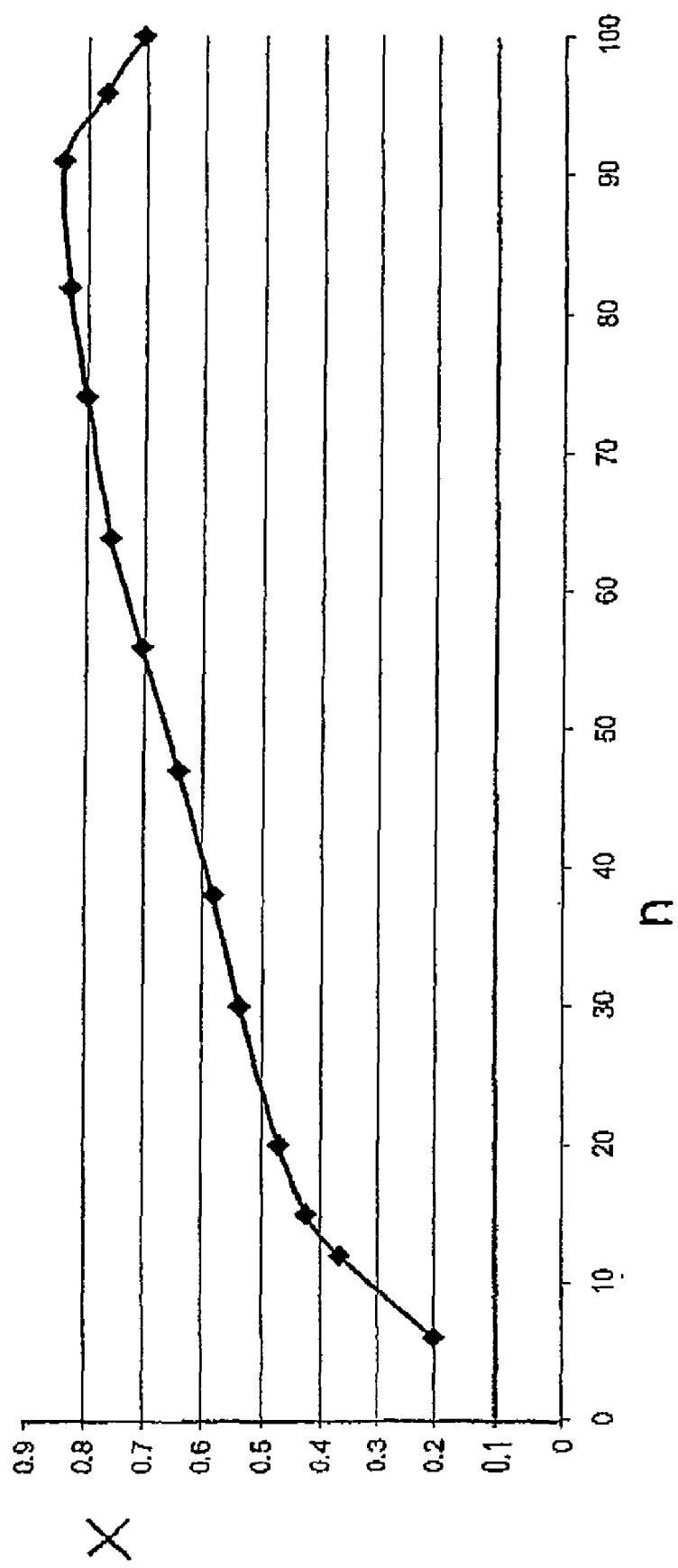

This application is a national stage application of International Application No. PCT/EP2004/013737, filed 3 Dec. 2004, which claims the benefit of Application No. GB0401603.6, filed 26 Jan. 2004, from which applications priority is claimed.

The invention concerns a settable mixture, a method of applying a coating, the coating and the use of the coating.

It has been previously proposed to apply a coating to a rock surface in a mine by spraying an aqueous emulsion of an organic polymer and causing the emulsion to coagulate to produce a flexible coating in the form of a film or skin on the surface. Polymers which have been disclosed for this purpose include polyurethanes and polychloroprene. The latter has been described in South African Patent No. 8203384. More recently there has been described in WO 98/58886 a composition comprising two parts. One is an aqueous emulsion of an organic polymer such as the copolymer of ethylene and vinyl acetate. The other part is a cementitious composition capable of absorbing at least its own weight of water. The cementitious composition described is an ettringite-forming composition containing high alumina cement, ordinary Portland cement and anhydrite. In use the two parts are sprayed onto a rock surface of a mine to form a coating. This patent also discloses a dry mixture of solids formed from the cementitions composition and a dried polymer emulsion to which mixture water is added in the mine.

Compositions described in the above mentioned WO 98/58886 take a significant time to reach an adequate early strength, typically not less than 24 hours. Whilst the coating is developing its strength, for safety reasons personnel are not admitted to the treated area and that part of the mine is therefore not productive. It is desirable therefore to reduce the time taken by the coating to develop an adequate early strength.

Recently, there has been described in WO 01/28955 a solution to this problem by providing an ettringite-forming cementitious composition richer in calcium aluminate than those described above and which gives a higher early strength. This ettringite-forming cementitious composition contains from 25 to 59 weight % calcium aluminate, from 0 to 10 weight % lime and from 0 to 50 weight % calcium sulfate.

Although the compositions described in the above mentioned WO 01/28955 take an improved (shorter) time to reach an adequate early strength, it is desirable to further reduce the setting times and to further improve the early strength.

Thus the object of the present invention is to improve the early strength of a corresponding coating which is applied to a surface.

The solution of this object is a settable mixture comprising (i) a water absorbing composition and
(ii) an aqueous emulsion of organic polymer or
(iii) dispersible organic polymer, wherein the water absorbing composition (i) contains inorganic ingredients which are capable to react with water and the water absorbing composition (i) contains at least 13 weight % lime and at least 5 weight % of a cementitious composition of which components form ettringite during the absorption of water and wherein the amount of the aqueous emulsion of organic polymer (ii) in relation to (i) is such as to provide a ratio of combined weight of polymer solids to combined weight of ingredients which are capable to react with water of from 0.5:1 to 10:1, preferably 1:1 to 4:1, wherein the amount of dispersible organic polymer (iii) in relation to (i) is such as to give a ratio of combined weight of polymers to combined weight of ingredients which are capable to react with water of from 0.5:1 to 10:1, preferably 1:1 to 4:1.

The term "ingredients which are capable to react with water" is intended to include on the one hand ingredients which only react with water (e.g. hydration of CaO) and on the other hand ingredients which react in one reaction with water and other ingredients (e.g. several cementitious ingredients which are reacting in a cementitious reaction with water). According to the present invention typical "ingredients which are capable to react with water" are cementitious components and quick lime (CaO), whereas fillers which are often used in cementitious compositions are not "ingredients which are capable to react with water" due to the present invention.

The lime may be quick lime (CaO) or may be provided by ordinary Portland cement which releases lime on hydration. Generally it is possible that the lime is provided by a cementitious composition.

The aqueous emulsion of organic polymer which is sometimes referred to in the art as a polymer latex emulsion may contain as the polymer one or more of a wide range of homopolymers or copolymers. Examples include styrene, styrene-butadiene co-polymers divinyl styrene, methyl methacrylate, copolymers of styrene and methyl methacrylate or maleic anhydride, acrylic an acrylic ester resins, vinyl acetate and copolymers thereof with ethylene and other olefins (e.g. ethylene vinyl acetate), plasticized vinyl chloride copolymers. Mixtures of polymers or copolymers may be also used. It is preferred to employ a polymer with a glass transition temperature of from −50° C. to +50° C. Plasticisers such as Cereclor (a chlorinated paraffin), dibutylpthalate and diethyleneglycol can be added to improve flexibility. Suitable polymer solids contents of the emulsion are from 5 to 80%, preferably at least 25% e.g. from 30 to 70%, more preferably 45 to 65% by weight based on the weight of the emulsion. The dispersible organic polymer is conveniently obtained by drying e.g. spray drying an aqueous polymer emulsion. The dried polymers are available commercially.

The high content of lime (at least 13 weight % of the water absorbing composition (i)) causes an intensive generation of hydration heat ($Ca(OH)_2$ is produced). As a result the setting time is reduced and the early strength is improved.

According to the present invention the water absorbing composition (i) contains at least 5 weight % of a cementitious composition of which components form ettringite during the absorption of water.

Ettringite is a calcium trisulphoaluminate having 32 molecules of water of crystallization and has the formula $3CaO.Al_2O_3.3CaSO_4.32H_2O$. Ettringite is produced by the hydration of cementitious materials containing calcium aluminate and calcium sulphate. Unless the context requires otherwise, the term ettringite in the present specification is intended to include ettringite analogues. These are defined in Cement Chemistry by H. F. H. Taylor $2^{nd}$ edition 1997 published by Thomas Telford.

Normally the sum of the weight of the lime and the weight of the cementitious composition is 67 to 100%, preferably 90 to 100% and more preferably approximately 100% of the total weight of the water absorbing composition (i). "Approximately 100%" means in this connection that it is possible that (i) does not only contain lime and the cementitious composition (i) but also impurities caused by other ingredients.

Mostly the water absorbing composition (i) contains at least 25 weight %, preferably at least 62 weight % of lime.

It is preferred that the cementitious composition contains calcium aluminate and calcium sulphate.

The term calcium aluminate is intended to include not only the form of calcium aluminate which is often written in cement notation as CA but also other aluminate-containing cements which are written as $CA_2$, $CA_3$, $C_{12}A_7$, $C_4AF$ and $C_{11}A_7CaF_2$ and in addition calcium sulphoaluminate and calcium ferroaluminate and analogues thereof. The calcium aluminate my be provided by high alumina cement, sometimes referred to as Ciment Fondu which normally contains about 40 to 80% by weight of calcium aluminate phases (or 40 to 50% by weight of calcium aluminate (CA)).

The calcium sulphate may be provided by a calcium sulphate-containing material such as beta-anhydrite, gypsum or plaster of Paris. References to calcium sulphoaluminate in the specification are to pure calcium sulphoaluminate which is of the formula $C_4A_3S^*$ where C is CaO or $Ca(OH)_2$), A is $Al_2O_3$ and $S^*$ is $SO_3$. This is sometimes known as Klein's compound and may also be written as $3CaO.3Al_2O_3.CaSO_4$.

In respect to the formation of ettringite the water absorbing composition (i) often contains a stoichiometric surplus of lime. The expression "a stoichiometric surplus of lime" means that at least a portion of the lime which is used as educt can not participate in the cementitious ettringite reaction—thus there is a remainder of quick lime which is hydrated.

The present invention furthermore concerns a method of applying a coating to a surface which method comprises forming a settable mixture of a water absorbing composition (i) and an aqueous emulsion (ii) as defined above and putting the mixture on the surface to form a coating preferably at least 2 mm in thickness and allowing the coating to set.

When the organic polymer emulsion (ii) is used the water may be the water already present in the emulsion (ii) whereby the water of the aqueous emulsion is used to hydrate the ingredients of the water absorbing compositions (i). If required or preferred additional water may be added.

The present invention also provides an alternative method of applying a coating to a surface which method comprises forming a settable mixture of a water absorbing composition (i) and an dispersible organic polymer (iii) as defined above combining the settable mixture with water and putting the mixture on the surface to form a coating preferably at least 2 mm in thickness and allowing the coating to set. In case the dried polymer emulsion (iii) is used with the water absorbing composition (i) it is necessary to add the water required to hydrate the ingredients of the water absorbing composition (i).

Whether using the emulsion of the dried polymer emulsion the weight of water is normally as such, that all the ingredients of the water absorbing composition (i) are converted by reaction with water. Normally the coating is applied to the surface by spraying the mixture onto the surface. Before the spraying other cement accelerators or retarders may be added. When it is desired to initiate or further increase the rate of setting this can be effected by the addition of an alkali.

The present invention also concerns a coating which is manufacturable according to a method which is defined above.

Furthermore the present invention provides the use of a such coating as a rock support means. It has been found that a coating of about 4 mm (e.g. 3 to 7 mm) in thickness may be used as a replacement for wire mesh employed to prevent spalling and loose rock fragments from falling in a mine. The coatings may be used in mines which are known as "hard rock mines" such us nickel or gold mines and also in coal mines.

The coatings may be used for example when mining coal by the room and pillar method to reduce the size of the pillars which are left to provide support and thereby recover more coal. This is achieved by spraying the coating under the pillar thereby increasing their load bearing capability. The coating may also be used to stabilise the ribs. The coatings may also be applied to reduce or prevent weathering, that is the erosion of freshly exposed rock surfaces by air in the mine or for the suppression of radon gas in an uranium mine or for stabilising embankments for examples in a quarry, for stabilising roofs of tunnels or the like.

The invention furthermore concerns the use of a coating as defined above as a waterproofing means. Therefore the coating is applied to at least partially overhanging surface. The waterproofing of mines and tunnels is often very appreciated because if water finds its way into the mine or the tunnel the working activities can be disturbed. The invention has application in the Construction Industry for treatment of buildings including internal and exterior walls, floors and ceilings.

Very often it is not only intended to improve the early strength (the early strength should be defined as to be the strength of the applied coating after a setting time of one hour) of the corresponding coating, but also to improve the elongation at break, the final strength and the price of the corresponding coating.

Especially if the coating is used as a waterproofing means a high elongation at break is desired—in this case the elongation at break should be at least 70%, preferably 110%.

In case the corresponding coating is used as a rock support means the parameter of the final strength is very important—in this case a final strength (final strength according to the invention should be defined as to be the tensile strength after a setting time of 28 days) should be at least 3 MPa, preferably 3.5 MPa.

Generally, it is preferred that the tensile strength after a setting time of one hour (early strength) is at least 0.4, preferably at least 0.5 and most preferably at least 0.75 Mpa.

The tensile strength and the elongation at break was measured according to the standard measuring method norm DIN 53504: S2, wherein S2 is the test sample.

Furthermore there is the general intention to reduce the price of the settable mixture.

It was found, that the optimisation of the characteristics early strength, elongation at break, final strength and price was possible by an appropriate variation of the parameter "content of lime in the water absorbing composition (i)":

Optimisation of the Characteristic "High Early Strength"

The water absorbing composition (i) should contain at least 5% of the cementitious composition, at least 13 weight %, preferably at least 25 weight %, and more preferably at least 62 weight % lime. Accordingly the sum of weight of lime and the weight of the cementitious composition should be 67 to 100%, preferably 90 to 100% and more preferably approximately 100% of the total weight of the water absorbing composition (i).

Optimisation of the Characteristics "Early Strength and Elongation at Break"

The water absorbing composition (i) should contain 5 weight % of the cementitious composition, and 25 to 92 weight %, preferably 62 to 83 weight % lime. Accordingly the sum of the weight of the lime and the weight of the cementitious composition should be 67 to 100%, preferably 90 to 100% and more preferably approximately 100% of the total weight of the water absorbing composition (i).

Optimisation of the Characteristics "Early Strength and Final Strength"

The water absorbing composition (i) should contain at least 5 weight % of the cementitious composition and 13 to 63 weight %, preferably 25 to 32 weight % lime. Accordingly the sum of the weight of the lime and the weight of the cementitious composition should be 67 to 100%, preferably 90 to 100% and more preferably approximately 100% of the total weight of the water absorbing composition (i).

Optimisation of the Characteristics "High Early Strength, Elongation at Break and Final Strength"

The water absorbing composition (i) should contain at least 5 weight % of the cementitious composition and 25 to 63 weight %, preferably 25 to 50 weight % lime. Accordingly the sum of the weight of the lime and the weight of the cementitious composition should be 67 to 100%, preferably 90 to 100% and more preferably approximately 100% of the total weight of the water absorbing composition (i).

Optimisation of the Characteristics "Early Strength, Elongation at Break, Final Strength and Low Price"

The water absorbing composition should contain at least 5 weight % of the cementitious composition and at least 25 to 92 weight %, preferably 30 to 50 weight % lime. Accordingly the sum of the weight of the lime and the weight of the cementitious composition should be 67 to 100%, preferably 90 to 100% and more preferably approximately 100% of the total weight of the water absorbing composition (i).

In the following the invention is further described by the drawing.

Figure 2:
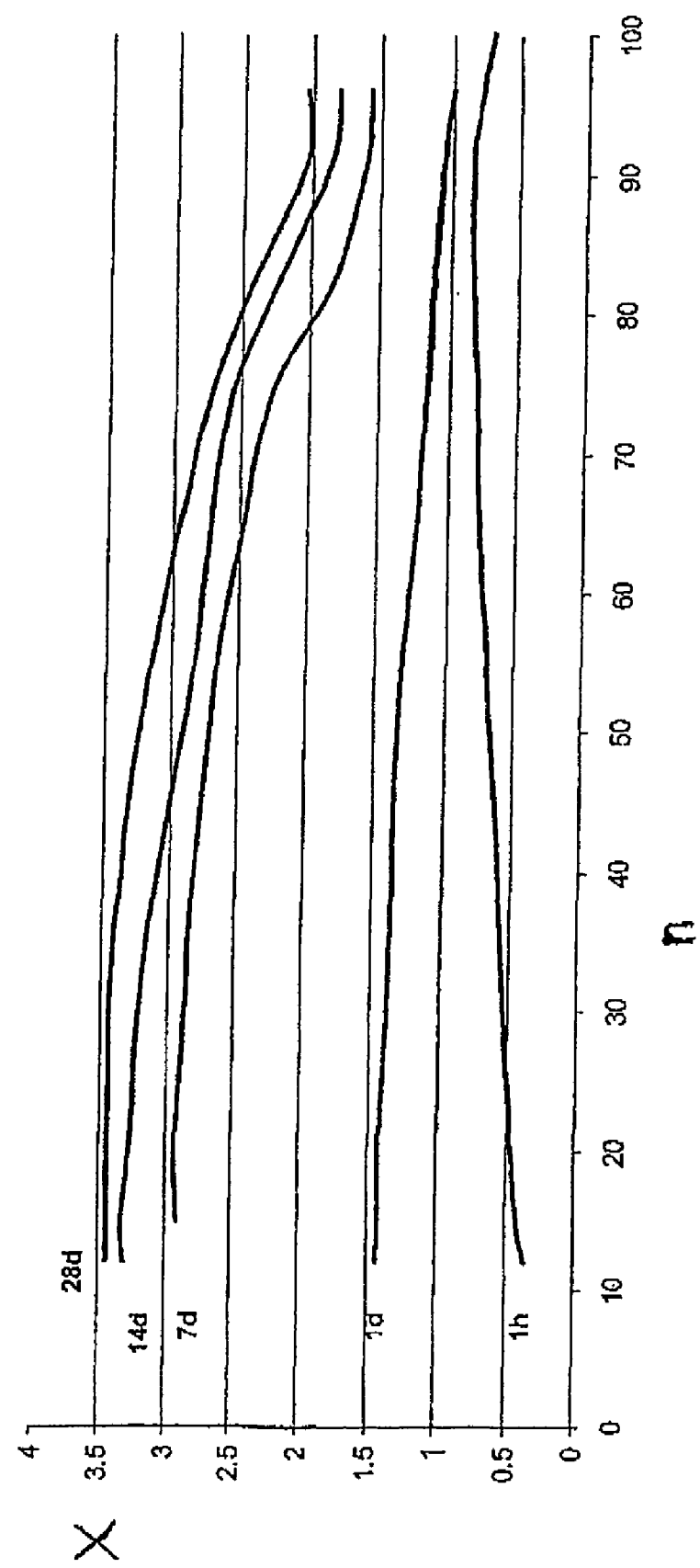
Figure 3:
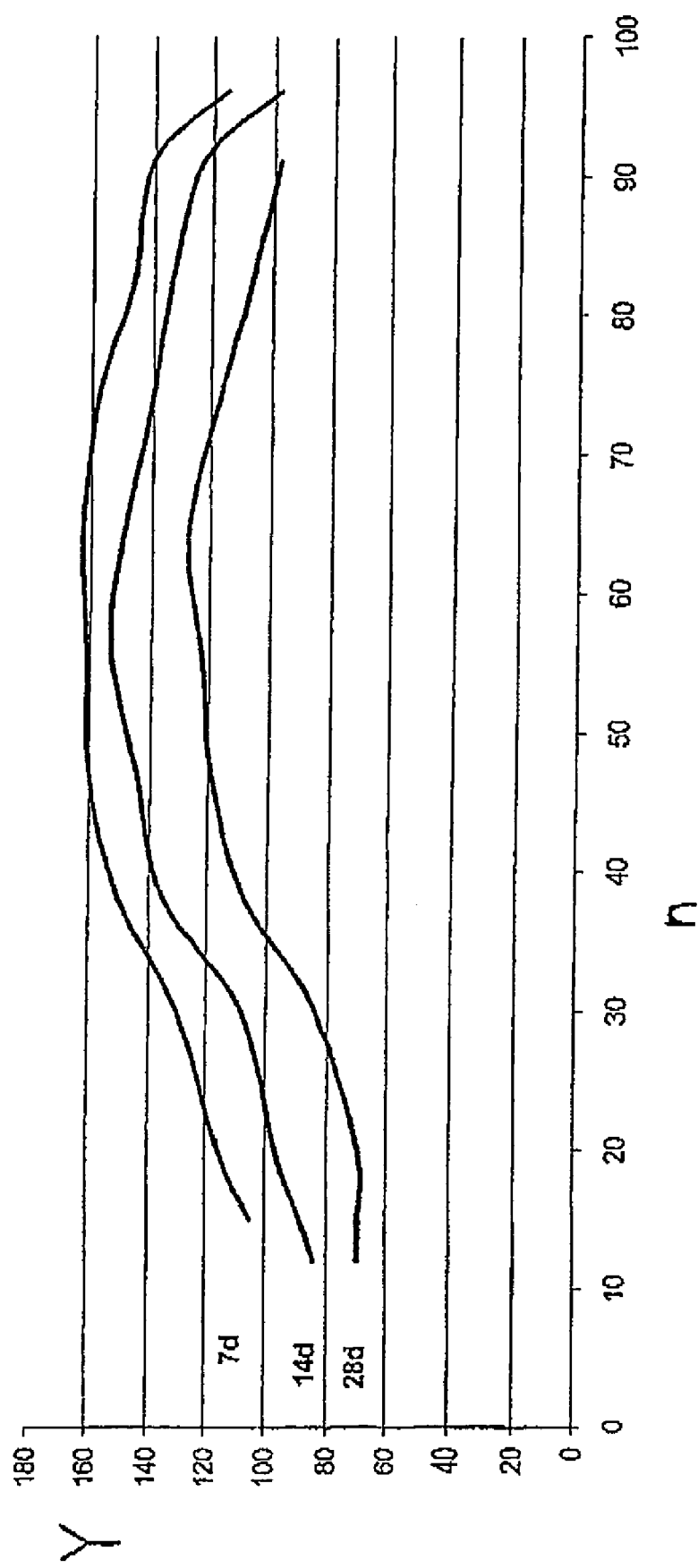

The drawing shows in FIG. 1 a diagram in which the early strength of a coating according to the present invention is plotted versus the content of lime in the water absorbing composition (i), in FIG. 2 a diagram in which the tensile strength of coatings according to the present invention having different setting times is plotted versus the content of lime in the water absorbing composition (i) and in FIG. 3 a diagram in which the elongation at break of coatings of the present invention having different setting times is plotted versus the content of lime in the water absorbing composition (i).

The coating of which characteristics are shown in the present drawing is based on a settable mixture consisting of 40 weight % of a water absorbing composition (i) and 60 weight % of dispersible organic polymer (iii). The basis of the water absorbing composition (i) are three weight parts of CSA Binder (a cement containing approximately 75 weight % $4CaO.3Al_2O_3.SO_4$ (Yeelimit) and 10 weight % $Na_2SO_4$ (Thenardite)) and two weight parts of CSA Expansive Agent (a cement containing approximately 63 weight % $CaSO_4$ (anhydrite), approximately 28 weight % CaO (Stabilite/Lime) and 8 weight % $4CaO.3Al_2O_3.SO_4$ (Yeelimit)). The content of lime is varied by the addition of CaO and $CaSO_4$ (anhydrite), respectively to the said mixture of CSA Binder and CSA Expansive Agent. The dispersible organic polymer (iii) consists of VINAPAS® RE 5044 N, which is a powder essentially comprising copolymers of vinyl acetate and ethylene.

In the diagram of FIG. 1, X (on ordinate) stands for "early strength [MPa]" and n (on abscissa) for the "weight % of CaO in the water absorbing composition (i)". An early strength of 0.4 MPa is achieved, if the water absorbing mixture (i) contains approximately at least 13 weight % lime. An early strength of at least 0.4 MPa is deemed to be necessary to provide a satisfying "coating technology". But it is preferred that the early strength of the coating is at least 0.5 MPa. It is important to note that it was not possible to measure the early strength of coatings which are based on water absorbing compositions (i) containing less than 6 weight % lime.

In the diagram of FIG. 2, X (on ordinate) stands for the "tensile strength [MPa]" and n (on abscissa) for "weight % of CaO in the water absorbing composition (i)". h stands for "setting time in hours" and d stands for "setting time in days". The diagram shows that an optimal final strength (at 28 d) is achieved by using a content of lime in the water absorbing composition (i) of from 13 to 32 weight %. Contents of lime smaller than 63 weight % also provide a satisfying final strength of at least 3 MPa.

In the diagram of FIG. 3, Y (on ordinate) stands for "elongation [%] at break of the corresponding coating" and n (on abscissa) stands for the "weight % of CaO in the water absorbing composition (i)". d stands for "setting time in days". It is important to note that the elongation at break concerning the "28 d coating" is significantly improved by using a lime content of more than 22 weight % in the water absorbing composition (i). If the coating is used as a water proofing means the "28 d value" of the elongation at break should be at least 70%.

The invention is further described with reference to the following non-limiting examples:

EXAMPLE 1

The settable mixture comprises 45 weight % of the water absorbing composition and 55 weight % of VINNAPAS® RE 5044 N (vinyl acetate-ethylene copolymer). The water absorbing composition contains 48.00 weight % CSA Binder (a cement containing approximately 75 weight % $4CaO.3Al_2O_3.SO_4$ (Yeelimit) and 10 weight % $Na_2SO_4$ (Thenardite)), 32.00 weight % CSA Expansive Agent (a cement containing approximately 63 weight % $CaSO_4$ (anhydrite), approximately 28 weight % CaO (Stabilite/Lime) and 8 weight % $4CaO.3Al_2O_3.SO_4$ (Yeelimit)) and 20.00 weight % CaO, so that the total amount of CaO in the water absorbing composition (i) is about 30 weight %. The corresponding coating produced has following characteristics:

Early strength (tensile strength corresponding to a setting time of 1 hour)>0.5 MPa Elongation at break (concerning a setting time of 28 days) >45%

Final strength (tensile strength corresponding to a setting time of 28 days)>3.5 MPa

EXAMPLE 2

The settable mixture consists of 70 weight % Arconal® 430 P (a polyacrylate containing powder), 24.00 weight % Scatto®-cement (contains 30 to 35 weight % melanterite, 25 to 30 weight % oxides like lime and jacobsite, 19 to 20 weight % carbonates like dolomite, siderit and calzit and 12 to 13 weight % silicate) and 6 weight % CaO. The water absorbing composition (i) of this settable mixture contains approximately 42 weight % of CaO.

Results:

Early strength>0.5 MPa

Elongation at break>100%

Final strength (28 d) approximately 2.5 Mpa

EXAMPLE 3

The settable mixture consists of 60.00 VINNAPAS® RE 5044 N, 14.00 Blue Circe Rockfast® A (a high aluminate cement) and of 26.00 weight % CaO. The water absorbing composition (i) contains approximately 69 weight % of CaO.

Results:
Early strength>0.5 MPa
Elongation at break (concerning a setting time of 28 days) >100%
Final strength (28 d) approximately 2.5 MPa The results of the examples above show that acceptable values of the characteristics early strength, elongation at break and final strength can also be achieved, if other parameters like the kind of the cement, the kind of the polymer and the proportion of polymer and water absorbing composition (i) are varied.

The invention claimed is:

1. A settable mixture comprising
   (i) a water absorbing composition and
   (ii) an aqueous emulsion of organic polymer or
   (iii) dispersible organic polymer,
   wherein the water absorbing composition (i) contains inorganic ingredients which are capable to react with water and the water absorbing composition (i) contains at least 13 weight % lime and at least 5 weight % of a cementitious composition of which components form ettringite during the absorption of water and
   wherein the amount of the aqueous emulsion of organic polymer (ii) in relation to (i) is such as to provide a ratio of combined weight of polymer solids to combined weight of ingredients which are capable to react with water of from 0.5:1 to 10:1, and
   wherein the amount of dispersible organic polymer (iii) in relation to (i) is such as to give a ratio of combined weight of polymers to combined weight of ingredients which are capable to react with water of from 0.5:1 to 10:1.

2. A settable mixture according to claim 1, wherein the sum of the weight of the lime and the weight of the cementitious composition is 67 to 100 of the total weight of the water absorbing composition (i).

3. The settable mixture according to claim 2 wherein the water absorbing composition (i) contains at least 62 weight % lime.

4. The settable mixture according to claim 2 wherein the cementitious composition contains calcium aluminate and calcium sulfate.

5. The settable mixture according to claim 2 wherein in respect to the formation of ettringite the water absorbing composition (i) contains a stoichiometric surplus of lime.

6. A settable mixture according to claim 1, wherein the water absorbing composition (i) contains at least 25 weight % lime.

7. A settable mixture according to claim 1, wherein the cementitious composition contains calcium aluminate and calcium sulfate.

8. A settable mixture according to claim 1, wherein in respect to the formation of ettringite the water absorbing composition (i) contains a stoichiometric surplus of lime.

9. The settable mixture according to claim 1 wherein the amount of the aqueous emulsion of organic polymer (ii) in relation to (i) is such as to provide a ratio of combined weight of polymer solids to combined weight of ingredients which are capable to react with water of from 1:1 to 4:1.

10. The settable mixture according to claim 1 wherein the amount of dispersible organic polymer (iii) in relation to (i) is such as to give a ratio of combined weight of polymers to combined weight of ingredients which are capable to react with water of from 1:1 to 4:1.

11. The settable mixture according to claim 1 wherein the water absorbing composition (i) contains at least 62 weight % lime.

12. A method of applying a coating to a surface which method comprises forming a settable mixture according to claim 1, containing a water absorbing composition (i) and an aqueous emulsion of organic polymer (ii) and putting the settable mixture on the surface to form a coating.

13. The method of applying a coating to a surface according to claim 12 wherein the coating is at least 2 mm in thickness.

14. A method of applying a coating to a surface which method comprises forming a settable mixture according to claim 1, containing water absorbing composition (i) and dispersible organic polymer (iii), combining the settable mixture with water and putting the mixture on the surface to form a coating.

15. The method of applying a coating to a surface according to claim 14 wherein the coating is at least 2 mm in thickness.

16. A method of applying a coating to a surface which method comprises forming a settable mixture according to claim 1, containing a water absorbing composition (i) and an aqueous emulsion of organic polymer (ii) and putting the settable mixture on the surface to form a coating, wherein the coating comprises a rock support means.

17. A method of applying a coating to a surface which method comprises forming a settable mixture according to claim 1, containing a water absorbing composition (i) and an aqueous emulsion of organic polymer (ii) and putting the settable mixture on the surface to form a coating, wherein the coating comprises a waterproofing means.

18. A method of applying a coating to a surface which method comprises forming a settable mixture according to claim 1, containing water absorbing composition (i) and dispersible organic polymer (iii), combining the settable mixture with water and putting the mixture on the surface to form a coating, wherein the coating comprises a rock support means or a waterproofing means.

19. The coating made according to the method which is defined in claim 12.

20. The coating made according to the method which is defined in claim 14.

* * * * *